(12) United States Patent
Na

(10) Patent No.: US 6,439,725 B1
(45) Date of Patent: Aug. 27, 2002

(54) OPTICAL SYSTEM OF A LIQUID CRYSTAL PROJECTOR FOR REDUCING TOTAL LENGTH OF THE SYSTEM

(75) Inventor: Man Ho Na, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/996,717

(22) Filed: Nov. 30, 2001

(30) Foreign Application Priority Data

Dec. 2, 2000 (KR) .............................................. 00-72707

(51) Int. Cl.[7] ........................ G03B 21/00; G03B 21/14; G02F 1/1335
(52) U.S. Cl. ................................. 353/31; 353/20; 349/9
(58) Field of Search ............................. 353/31, 33, 34, 353/37, 20; 349/5, 6, 7, 8, 9

(56) References Cited

U.S. PATENT DOCUMENTS 5,959,773 A * 9/1999 Gagnon ...................... 359/495
6,176,586 B1 * 1/2001 Hirose et al. .................. 353/31

* cited by examiner

*Primary Examiner*—Russell Adams
*Assistant Examiner*—Melissa Koval
(74) *Attorney, Agent, or Firm*—Fleshner & Kim, LLP

(57) ABSTRACT

Optical system of a liquid crystal projector with three reflective liquid crystal displays, wherein a first light path changing part among first to third light path changing parts is designed such that a first color path surrounds three faces of a first of liquid crystal panel except a side of a connector thereof, for avoiding interference of the color light path with the connector, thereby reducing a total length of the optical system.

15 Claims, 3 Drawing Sheets

OPTICAL SYSTEM OF A LIQUID CRYSTAL PROJECTOR FOR REDUCING TOTAL LENGTH OF THE SYSTEM

This application claims the benefit of the Korean Application No. P2000-72707 filed on Dec. 02, 2000, which is hereby incorporated by reference.

BACKGROUND OF THE INVENTION

1. Field of the Invention

The present invention relates to a liquid crystal projector, and more particularly, to an optical system of a liquid crystal projector with three reflective liquid crystal displays.

2. Background of the Related Art

Recently, as demands on large sized, and high resolution pictures become the stronger, projectors are paid attention as displays, for making enlargement projection of a picture by means of a projection lens system. The picture may be projected in front or rear direction.

The liquid crystal projector projects a light from a light source to a liquid crystal panel, and therefrom to a screen by means of a projection optical system. When the picture is projected to the screen in rear of the liquid crystal panel directly, a distance of projection distance between the screen and the projection optical system requires a large space in rear of the screen, to make the projector thick, that impedes fabrication of a thin projector.

As a solution for this problem, a total reflection mirror may be provided between the screen and the projection optical system, to fold an optical path, that can reduce the thickness of the projector. In this instance, though the thickness of the projector may be reduced further by reducing an angle of dispose of the total reflection mirror, there has been a limit in the angle of dispose between the mirror and the projection optical system for projection of the picture on the screen without distortion, and there has been a limitation in reduction of a system thickness coming from intrinsically required total length of an optical system consisting of a lighting system, the liquid crystal panel, and the projection lens system.

Accordingly, there have been various plans for reducing the total length of the optical system. FIG. 1 illustrates a related art optical system of a liquid crystal projector, employing a polarizing beam sprite prism which reflects, or transmits an incident light depending on a wavelength and a direction of polarization, for reducing a total length of the optical system.

In detail, the optical system in FIG. 1 is provided with a fly eye lens (FEL) 42 between a light source 40 and a first total reflection mirror 44, and a second FEL 46, a polarizing beam sprite array (PBS array) 47, and a focusing lens 48 between the first total reflection mirror 44 and a second total reflection mirror 50.

The optical system of a liquid crystal projector in FIG. 1 is further provided with a dichroic mirror 52 on an optical path of a light reflected at the second total reflection mirror 50, a first polarizing beam sprite prism (PBSP) 54A on an optical path between the first dichroic mirror 52 and a blue liquid crystal panel 56A, a second PBSP 54B on an optical path between the first dichroic mirror 52 and a green liquid crystal panel 56B, a first relay lens 60, a third total reflection mirror 62, a second relay lens 64, fourth, and fifth total reflection mirrors 66 and 68, a third PBSP 54C on an optical path between the second PBSP 54B and a red liquid crystal panel 56C, a dichroic prism 70 among the first, to third PBSPs 54A, 54B, and 54C, and a projection lens 72 opposite to a light projecting surface of the dichroic prism 70.

Since the second PBSP 54B can separate colors, the foregoing optical system can reduce a number of dichroic mirrors, to reduce a total length of the optical system. In this instance, a red light passed through the second PBSP 54B proceeds along an optical path that is turned in a form surrounding the third liquid crystal panel 56C by the fourth to sixth total reflection mirrors 62, 66, and 68, and is directed to the third liquid crystal panel 56C.

In the meantime, in general, a connector 10 is fitted at a side of the third liquid crystal panel, 56C i.e., at a bottom thereof in FIG. 1 for connecting the third liquid crystal panel 56C to external signal lines, causing an interference with the path of the red light. Accordingly, as the path of the red light is required to be spaced away from the connector 10 of the third liquid crystal panel 56C as far as possible, there is a limitation in reducing the total length of the optical system.

SUMMARY OF THE INVENTION

Accordingly, the present invention is directed to an optical system of a liquid crystal projector that substantially obviates one or more of the problems due to limitations and disadvantages of the related art.

An object of the present invention is to provide an optical system of a liquid crystal projector, in which a total length of the optical system is reduced to reduce a thickness of an entire system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the optical system of a liquid crystal projector for superimposing, enlarging, and projecting pictures displayed on first to third liquid crystal panels by using color lights received through first to third light path changing parts, wherein the first light path changing part includes a first sub-light path part for making a first time alteration of a linearly polarized light component of the color light received from one of the first to third light path changing parts, a second sub-light path part for reflecting the color light from the first sub-light path part, and making a second alteration of the linearly polarized component of a reflected color light, and forwarding to the first sub-light path part, and a third sub-light path part for directing the color light received through the second sub-light path part and the first sub-light path part to the first liquid crystal panel relevant to the color light, wherein the first to third sub-light path parts are arranged spaced away from the first liquid crystal panel, on sides of the first liquid crystal panel respectively except a side the connector is fitted thereto.

The first sub-light path part includes a first λ/2 plate for altering a linearly polarized component of a color light received from one of the second, and third light path changing parts, the second sub-light path part includes a first total reflection mirror for reflecting the color light from the second sub-light path part at a right angle, a second total reflection mirror for reflecting back the color light from the first total reflection mirror, a λ/4 plate for altering a first linearly polarized light in one direction from the first total reflection mirror to a circular polarized light and forwarding the circular polarized light, and altering a circular polarized light from the second total reflection mirror to a second linearly polarized light in the other direction, and forwarding the second linearly polarized light, and the third sub-light path part includes a first polarizing beam sprite prism (PBSP) for transmitting the first linearly polarized light from the first $\lambda/2$ plate toward the first total reflection mirror, and reflecting the second linearly polarized light from the first total reflection mirror at a right angle, a second PBSP for reflecting the second linearly polarized light from the first PBSP toward the first liquid crystal panel at a right angle, and a second $\lambda/2$ plate for altering the first linearly polarized light from the second PBSP to a second linearly polarized light.

The first, second, and third sub-light path parts further includes at least one refractive lens for preventing light scattering and relaying an image forming point, and the refractive lens in the first sub-light path part is arranged between the first $\lambda/2$ plate and the first PBSP, the refractive lens in the second sub-light path part is arranged between the $\lambda/4$ plate and the second total reflection mirror, and the refractive lens in the third sub-light path part is arranged between the first PBSP and the second PBSP.

The second sub-light path part further includes a color filter for enhancing a purity of the color light, and the color filter is arranged between the $\lambda/4$ plate and the second total reflection mirror.

The $\lambda/4$ plate is arranged between the first total reflection mirror and the second total reflection mirror, the first PBSP is arranged between the first $\lambda/2$ plate and the first total reflection mirror, and the second PBSP is arranged between the first liquid crystal panel and the second $\lambda/2$ plate.

In another aspect of the present invention, there is provided an optical system of a liquid crystal projector for superimposing, enlarging, and projecting pictures displayed on first to third liquid crystal panels including a light source, an illuminating part for altering a white light from the light source to a linearly polarized light, and forwarding the linearly polarized light, a color separating part for separating the white color from the illuminating part into first to third color lights, a third light path changing part for reflecting the three color lights to the third liquid crystal panel, a second light path changing part for reflecting two color lights received through the third light path changing part to the second liquid crystal panel, and a first light path changing part including a first sub-light path part for making a first time alteration of a linearly polarized light component of the first color light received from the second light path changing part, a second sub-light path part for reflecting the first color light from the first sub-light path part, and making a second alteration of the linearly polarized component of a reflected first color light, and forwarding to the first sub-light path part, and a third sub-light path part for directing the first color light received through the second sub-light path part and the first sub-light path part to the first liquid crystal panel, wherein the first to third sub-light path parts are arranged spaced away from the first liquid crystal panel, on sides of the first liquid crystal panel respectively except a side the connector is fitted thereto.

In the first light path changing part, the first sub-light path part includes a first $\lambda/2$ plate for altering a linearly polarized component of a color light received from one of the second, and third light path changing parts, the second sub-light path part includes a first total reflection mirror for reflecting the color light from the second sub-light path part at a right angle, a second total reflection mirror for reflecting back the color light from the first total reflection mirror, a $\lambda/4$ plate for altering a first linearly polarized light in one direction from the first total reflection mirror to a circular polarized light and forwarding the circular polarized light, and altering a circular polarized light from the second total reflection mirror to a second linearly polarized light in the other direction, and forwarding the second linearly polarized light, and the third sub-light path part includes a first polarizing beam sprite prism (PBSP) for transmitting the first linearly polarized light from the first $\lambda/2$ plate toward the first total reflection mirror, and reflecting the second linearly polarized light from the first total reflection mirror at a right angle, a second PBSP for reflecting the second linearly polarized light from the first PBSP toward the first liquid crystal panel at a right angle, and a second $\lambda/2$ plate for altering the first linearly polarized light from the second PBSP to a second linearly polarized light.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
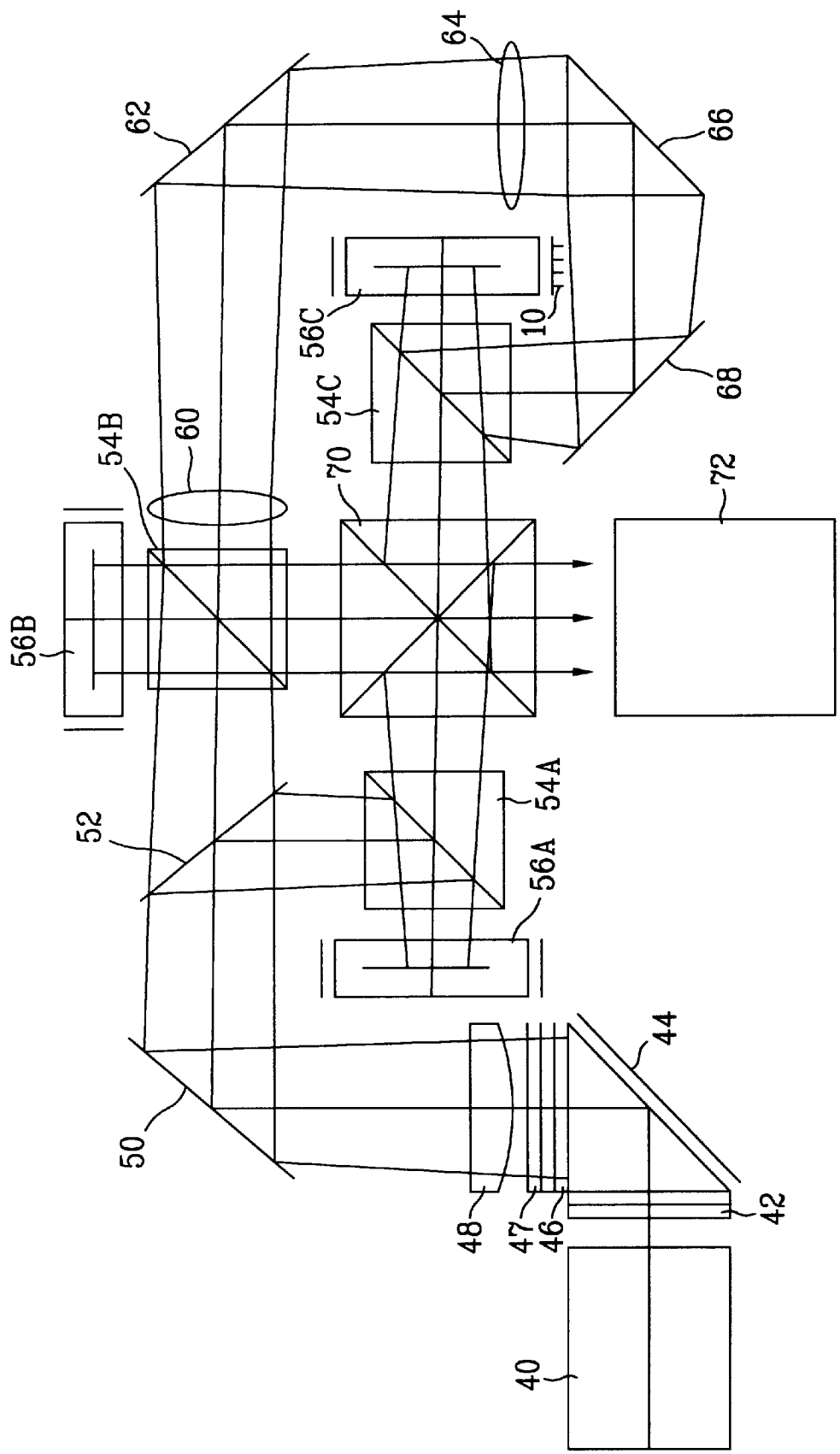
FIG. 1 illustrates a related art optical system of a liquid crystal projector.
Figure 2:
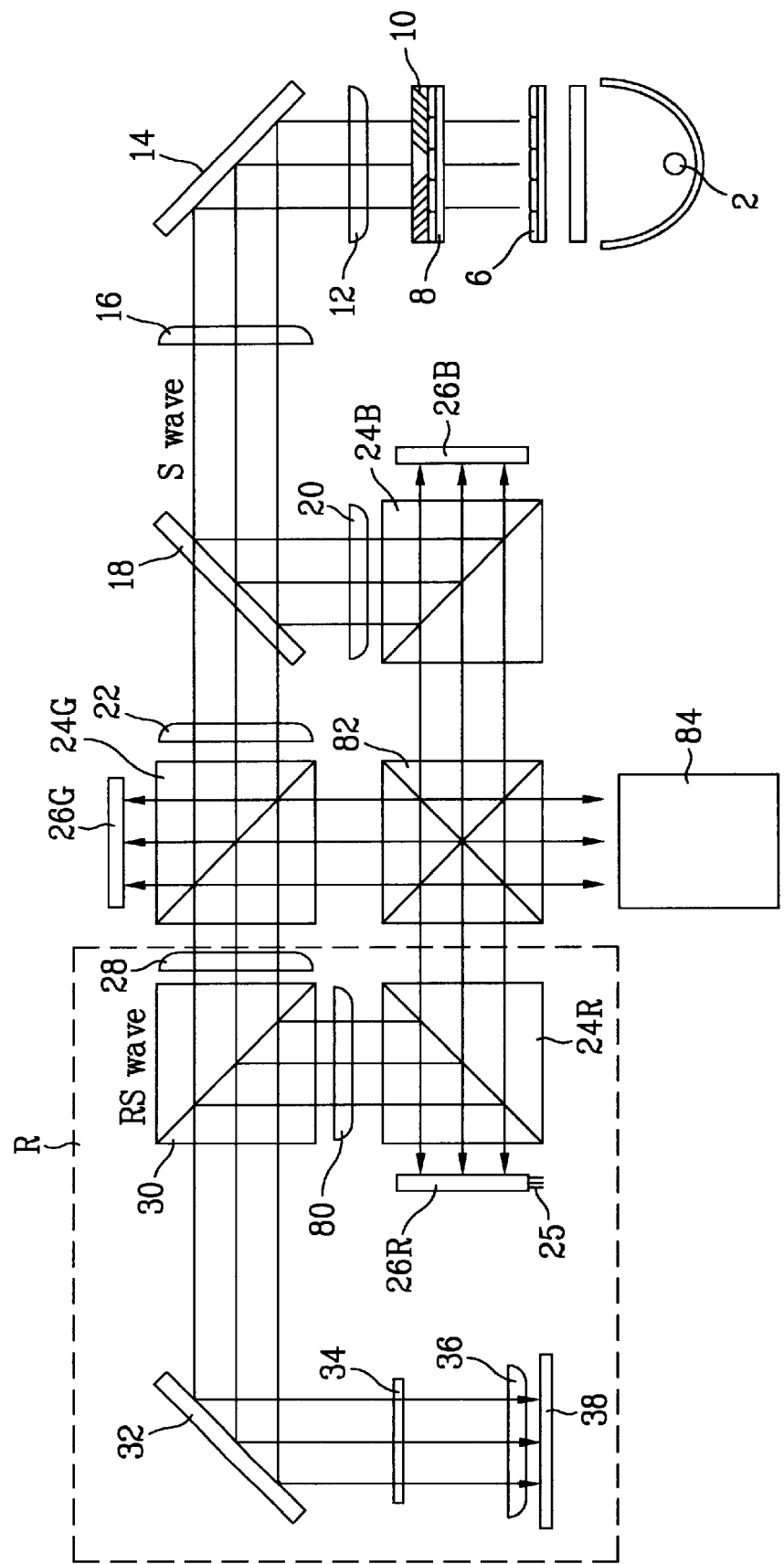
FIG. 2 illustrates an optical system of a liquid crystal projector in accordance with a preferred embodiment of the present invention; and, FIG. 3 illustrates a detail of a red light path in an 'R' optical system in FIG. 2.

Reference will now be made in detail to the preferred embodiments of the present invention, examples of which are illustrated in the accompanying drawings. FIG. 2 illustrates an optical system of a liquid crystal projector in accordance with a preferred embodiment of the present invention.

Referring to FIG. 2, the optical system of a liquid crystal projector in accordance with a preferred embodiment of the present invention has a red light path provided to avoid a direction a connector of the red light liquid crystal panel is fitted. To do this, the optical system of a liquid crystal projector in FIG. 2 includes first, and second FELs 6 and 8, a PBS array 10, and a first focusing lens 12 between a light source 2 and the first total reflection mirror 14, and a second focusing lens 16 between a first focusing lens 12 and a first dichroic mirror 18.

A visible light from the light source 2 proceeds toward the first FEL 6. The FEL 6 divides the light in cell units, and focuses onto respective lens cells in the second FEL 8. The second FEL 8 collimates the lights to be parallel to a particular part, and directs toward the PBS array 10 fitted on a rear surface thereof, for assuring uniformity of light distribution directed to the liquid crystal panels 26R, 26G, and 26B by means of the first, and second FELs 6 and 8. The PBS array 10 splits the light into linearly polarized lights each having either one of optical axes, i.e., a P polarized light, and an S polarized light, and a ½ wavelength plate (not shown) partly fitted to rear of the PBS array 10 alters the transmitted P polarized light to an S polarized light. Accordingly, as all input lights are altered into the S polarized light by the PBS array 10, most of the light from the light source 2 is directed to the liquid crystal panels 26R, 26G, and 26B to be explained later. The first total reflection mirror 14 reflects the input light fully toward the dichroic mirror 18. The first, and second focusing lenses 12 and 16 focus the input light, for preventing light scattering.

The optical system of a liquid crystal projector in FIG. 2 also includes a first PBSP 24B between the first dichroic mirror 18 and the blue liquid crystal panel 26B, a second PBSP 24G between the first dichroic mirror 18 and a green liquid crystal panel 26G, a red light optical system R between the second PBSP 24G and the red liquid crystal panel R so as not to interference a connector of the red liquid crystal panel 26R, a dichroic prism 82 between a third PBSP 24R and the first, and second PBSPs 24B and 25G, and a projection lens 84 on a light projection side of the dichroic prism 82.

The dichroic mirror 82 reflects a blue light in an input light, and transmits a red light and a green light both having wavelengths longer than the blue light. The first PBSP 24B has different reflective, or transmissive characteristic depending on the linearly polarized light. In detail, the first PBSP 24B reflects a blue linearly polarized light (S polarized light) reflected at the first dichroic mirror 18 toward the blue liquid crystal panel 26B, and transmits a blue linearly polarized light (P polarized light) from the blue liquid crystal panel 26B to proceeds toward the dichroic prism 82. There is a third focusing lens 20 between the first dichroic mirror 18 and the first PBSP 24B for prevention of light scattering. The second PBSP 24G has different reflective or transmissive characteristic depending on a linearly polarized light and a wavelength. In detail, the second PBSP 24G reflects a green linearly polarized light (S polarized light) in lights transmitted through the first dichroic mirror 18 toward the green liquid crystal panel 26G, and transmits a green linearly polarized light (P polarized light) from the green liquid crystal panel 26G to proceeds toward the dichroic prism 82. Also, the second PBSP 24G transmits a red linearly polarized light (S polarized light) in the lights transmitted through the first dichroic mirror 18 to proceed toward the red liquid crystal panel 26R.

Figure 3:
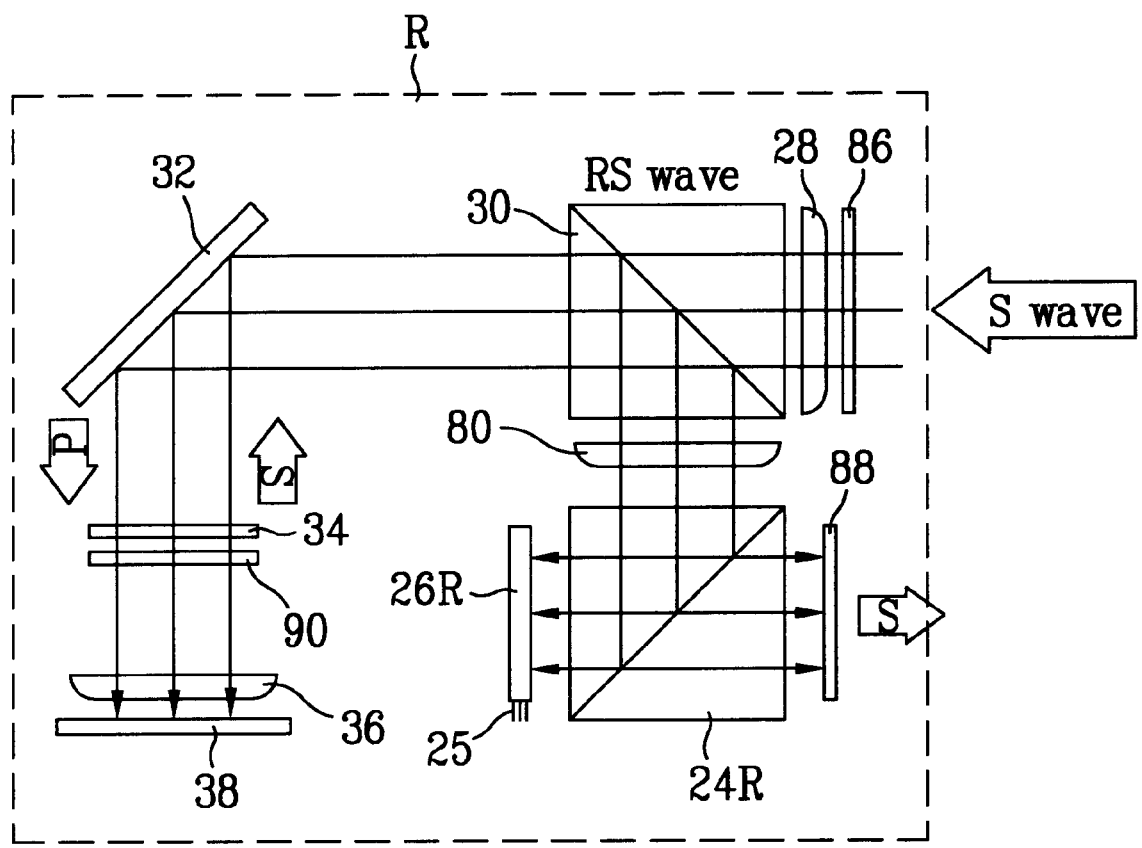

The red optical system R forms a red light path not to interfere with the connector 25 of the red liquid crystal panel 26R. To do this, referring to FIG. 3, the red optical system R includes a first $\lambda/2$ plate 86, and a fourth PBSP 30 arranged in succession on a red light path, a second total reflection mirror 32, a $\lambda/4$ plate 34, a red light filter 90, and a total reflection mirror 38 arranged on a path of a red light transmitted through the fourth PBSP 30 in succession, a third PBSP 24R between a fourth PBSP 30 and a red liquid crystal panel 26R, and a second $\lambda/2$ plate 88 between the third PBSP 24R and the dichroic prism 82. The red optical system R also includes third to fifth focusing lenses 28, 36, and 80 for focusing a light on a red light path.

The first $\lambda/2$ plate 86 alters the red S polarized light transmitted through the second PBSP 24G to a P polarized light, and forward the P polarized light. The fourth PBSP 30 transmits the red P polarized light from the first $\lambda/2$ plate 86. The second total reflection mirror 32 totally reflects the red P polarized light from the fourth PBSP 30. The $\lambda/4$ plate 34 alters the red P polarized light from the second total reflection mirror 32 to a circular polarized light rotating in one direction, and forwards the circular polarized light. The circular polarized light from the $\lambda/4$ plate 34 is totally reflected at the third total refection mirror 38, and returns to the $\lambda/4$ plate 34. The $\lambda/4$ plate 34 alters the circular polarized light thus returned at the third total reflection mirror 38 to an S polarized light in a direction different from the P polarized light from the second total reflection mirror 32, and forwards the S polarized light. The red filter 90 between the $\lambda/4$ plate 34 and the third total reflection mirror 38 enhances a purity of a red light. The S polarized light from the $\lambda/4$ plate 34 is totally reflected at the second total reflection mirror 32, and proceeds toward the fourth PBSP 30. The fourth PBSP 30 reflects the S polarized light reflected at the second total reflection mirror toward the third PBSP 24R. The third PBSP 24R reflects the red S polarized light reflected at the fourth PBSP 30 toward the red liquid crystal panel 26R, and transmits the red P polarized light from the red liquid crystal panel 24B. The second $\lambda/2$ plate 88 alters the red P polarized light from the third PBSP 24R to an S polarized light, and provides to the dichroic prism 82. The fourth to sixth total reflection mirrors 62, 66, and 68 turns a light path by totally reflecting an incident light. The focusing lenses, for an example, the third focusing lens 28 between the first $\lambda/2$ plate 86 and the fourth PBSP 30, the fourth focusing lens 36 between the red filter 90 and the third total reflection mirror 38, and the fifth focusing lens 80 between the fourth, and third PBSPs 30 and 24R, focus the red light as well as relay an image forming point of the red light, to form the image on the red liquid crystal panel 26R again, for preventing a light loss caused by elongation of a light path of the red light longer than other lights. The first to third liquid crystal panels 26B, 26G, and 26R, reflective type liquid crystal panels, alter the S polarized lights respectively reflected at the first to third PBSPs 24B, 24G, and 24R to P polarized lights according to a picture signal, and present the P polarized lights, to form an image. The dichroic prism 82 superimposes the red light, the green light, and the blue light incident thereto respectively after obtaining picture information at the first to third liquid crystal panel 26B, 26G, and 26R, and forwards a superimposed light through a projection surface to the projection lens 84. Then, the projection lens 84 enlarges, and projects the picture from the dichroic prism 82 to a screen.

Thus, the optical system of a liquid crystal projector in the embodiment of the present invention forms a red light path so as to avoid a connector 25 at one side of the red liquid crystal panel 26R, to resolve the problem of interference between the red liquid crystal panel 26R and the connector 25, thereby permitting further reduction of a total length of the optical system.

As explained, the optical system of a liquid crystal projector of the present invention forms a path of a particular color light so as to avoid a connector at one side of a liquid crystal panel for the particular color light, to resolve the problem of interference between the liquid crystal panel for the particular color light and the connector, thereby permitting further reduction of a total length of the optical system, that in turn reduces a thickness of the liquid crystal projector system.

It will be apparent to those skilled in the art that various modifications and variations can be made in the optical system of a liquid crystal projector of the present invention without departing from the spirit or scope of the invention. Thus, it is intended that the present invention cover the modifications and variations of this invention provided they come within the scope of the appended claims and their equivalents.

What is claimed is:

1. An optical system of a liquid crystal projector for superimposing, enlarging, and projecting pictures displayed on first to third liquid crystal panels by using color lights received through first to third light path changing parts, the first light path changing part comprising:
   a first sub-light path part for making a first time alteration of a linearly polarized light component of the color light received from one of the first to third light path changing parts;
   a second sub-light path part for reflecting the color light from the first sub-light path part, and making a second alteration of the linearly polarized component of a reflected color light, and forwarding to the first sub-light path part; and,
   a third sub-light path part for directing the color light received through the second sub-light path part and the first sub-light path part to the first liquid crystal panel relevant to the color light,
   wherein the first to third sub-light path parts are arranged spaced away from the first liquid crystal panel, on sides of the first liquid crystal panel respectively except a side the connector is fitted thereto.

2. An optical system as claimed in claim 1, wherein the first sub-light path part includes a first $\lambda/2$ plate for altering a linearly polarized component of a color light received from one of the second, and third light path changing parts,
   the second sub-light path part includes a first total reflection mirror for reflecting the color light from the second sub-light path part at a right angle, a second total reflection mirror for reflecting back the color light from the first total reflection mirror, a $\lambda/4$ plate for altering a first linearly polarized light in one direction from the first total reflection mirror to a circular polarized light and forwarding the circular polarized light, and altering a circular polarized light from the second total reflection mirror to a second linearly polarized light in the other direction, and forwarding the second linearly polarized light, and
   the third sub-light path part includes a first polarizing beam sprite prism (PBSP) for transmitting the first linearly polarized light from the first $\lambda/2$ plate toward the first total reflection mirror, and reflecting the second linearly polarized light from the first total reflection mirror at a right angle, a second PBSP for reflecting the second linearly polarized light from the first PBSP toward the first liquid crystal panel at a right angle, and a second $\lambda/2$ plate for altering the first linearly polarized light from the second PBSP to a second linearly polarized light.

3. An optical system as claimed in claim 2, wherein the first, second, and third sub-light path parts further includes at least one refractive lens for preventing light scattering and relaying an image forming point.

4. An optical system as claimed in claim 3, wherein the refractive lens in the first sub-light path part is arranged between the first $\lambda/2$ plate and the first PBSP, the refractive lens in the second sub-light path part is arranged between the $\lambda/4$ plate and the second total reflection mirror, and the refractive lens in the third sub-light path part is arranged between the first PBSP and the second PBSP.

5. An optical system as claimed in claim 2, wherein the second sub-light path part further includes a color filter for enhancing a purity of the color light.

6. An optical system as claimed in claim 5, wherein the color filter is arranged between the $\lambda/4$ plate and the second total reflection mirror.

7. An optical system as claimed in claim 2, wherein the $\lambda/4$ plate is arranged between the first total reflection mirror and the second total reflection mirror.

8. An optical system as claimed in claim 2, wherein the first PBSP is arranged between the first $\lambda/2$ plate and the first total reflection mirror, and the second PBSP is arranged between the first liquid crystal panel and the second $\lambda/2$ plate.

9. An optical system of a liquid crystal projector for superimposing, enlarging, and projecting pictures displayed on first to third liquid crystal panels comprising:
   a light source;
   an illuminating part for altering a white light from the light source to a linearly polarized light, and forwarding the linearly polarized light;
   a color separating part for separating the white color from the illuminating part into first to third color lights;
   a third light path changing part for reflecting the three color lights to the third liquid crystal panel;
   a second light path changing part for reflecting two color lights received through the third light path changing part to the second liquid crystal panel; and,
   a first light path changing part including;
      a first sub-light path part for making a first time alteration of a linearly polarized light component of the first color light received from the second light path changing part,
      a second sub-light path part for reflecting the first color light from the first sublight path part, and making a second alteration of the linearly polarized component of a reflected first color light, and forwarding to the first sub-light path part, and
      a third sub-light path part for directing the first color light received through the second sub-light path part and the first sub-light path part to the first liquid crystal panel,
      wherein the first to third sub-light path parts are arranged spaced away from the first liquid crystal panel, on sides of the first liquid crystal panel respectively except a side the connector is fitted thereto.

10. An optical system as claimed in claim 9, wherein the third light path changing part includes;
    a dichroic mirror for receiving first to third color lights from the color separating part, transmitting the first, and second color lights, and reflecting the third color light at a right angle, and
    a first PBSP for reflecting the third color light reflected at the dichroic mirror toward the third liquid crystal panel at a right angle, and transmitting the third color light having picture information through the third liquid crystal panel.

11. An optical system as claimed in claim 9, wherein the second optical path changing part includes a second PBSP for receiving the first and second color lights from the first light path changing part, transmitting the first color light, reflecting the second color light toward the second liquid crystal panel at a right angle, and transmitting the second color light having picture information from the second liquid crystal panel.

12. An optical system as claimed in claim 9, wherein, in the first light path changing part, the first sub-light path part includes a first $\lambda/2$ plate for altering a linearly polarized component of a color light received from one of the second, and third light path changing parts,
    the second sub-light path part includes a first total reflection mirror for reflecting the color light from the second sub-light path part at a right angle, a second total reflection mirror for reflecting back the color light from the first total reflection mirror, a $\lambda/4$ plate for altering a first linearly polarized light in one direction from the first total reflection mirror to a circular polarized light and forwarding the circular polarized light, and altering a circular polarized light from the second total reflection mirror to a second linearly polarized light in the other direction, and forwarding the second linearly polarized light, and the third sub-light path part includes a first polarizing beam sprite prism (PBSP) for transmitting the first linearly polarized light from the first $\lambda/2$ plate toward the first total reflection mirror, and reflecting the second linearly polarized light from the first total reflection mirror at a right angle, a second PBSP for reflecting the second linearly polarized light from the first PBSP toward the first liquid crystal panel at a right angle, and a second $\lambda/2$ plate for altering the first linearly polarized light from the second PBSP to a second linearly polarized light.

13. An optical system as claimed in claim 12, wherein the first, second, and third sub-light path parts further includes at least one refractive lens for preventing light scattering and relaying an image forming point, and the refractive lens in the first sub-light path part is arranged between the first $\lambda/2$ plate and the first PBSP, the refractive lens in the second sub-light path part is arranged between the $\lambda/4$ plate and the second total reflection mirror, and the refractive lens in the third sub-light path part is arranged between the first PBSP and the second PBSP.

14. An optical system as claimed in claim 12, wherein the second sub-light path part further includes a color filter for enhancing a purity of the color light, and the color filter is arranged between the $\lambda/4$ plate and the second total reflection mirror.

15. An optical system as claimed in claim 12, wherein the $\lambda/4$ plate is arranged between the first total reflection mirror and the second total reflection mirror, and the first PBSP is arranged between the first $\lambda/2$ plate and the first total reflection mirror, and the second PBSP is arranged between the first liquid crystal panel and the second $\lambda/2$ plate.

\* \* \* \* \*